US010859080B2

(12) United States Patent
Chang

(10) Patent No.: US 10,859,080 B2
(45) Date of Patent: Dec. 8, 2020

(54) VALVE HEAD STRUCTURE FOR DIAPHRAGM PUMP AND DIAPHRAGM PUMP HAVING SAME

(71) Applicant: XIAMEN KOGE MICRO TECH CO., LTD., Xiamen (CN)

(72) Inventor: Chih Chang, Xiamen (CN)

(73) Assignee: XIAMEN KOGE MICRO TECH CO., LTD., Xiamen (CN)

( * ) Notice: Subject to any disclaimer, the term of this patent is extended or adjusted under 35 U.S.C. 154(b) by 425 days.

(21) Appl. No.: 15/864,086

(22) Filed: Jan. 8, 2018

(65) Prior Publication Data

US 2019/0136846 A1    May 9, 2019

(30) Foreign Application Priority Data

Nov. 3, 2017  (CN) .......................... 2017 1 1068120
Nov. 3, 2017  (CN) ..................... 2017 2 1452475 U

(51) Int. Cl.
| | |
|---|---|
| *F04B 43/02* | (2006.01) |
| *F16K 7/17* | (2006.01) |
| *F04B 53/10* | (2006.01) |
| *F04B 43/04* | (2006.01) |
| *F04B 43/00* | (2006.01) |

(52) U.S. Cl.
CPC ........ *F04B 43/026* (2013.01); *F04B 53/1087* (2013.01); *F16K 7/17* (2013.01); *F04B 43/0045* (2013.01); *F04B 43/04* (2013.01); *F04B 53/106* (2013.01)

(58) Field of Classification Search
CPC .... F04B 43/0045; F04B 43/04; F04B 43/026; F04B 53/1037–106; F16K 15/14; F16K 15/16; F16K 15/03–038
See application file for complete search history.

(56) References Cited

U.S. PATENT DOCUMENTS

| | | | | |
|---|---|---|---|---|
| 3,339,738 | A | * | 9/1967 | Casaleggi ............. F16K 11/065 210/136 |
| 3,343,529 | A | * | 9/1967 | Miller .................... A61B 5/095 600/542 |
| 3,613,720 | A | * | 10/1971 | Welch ................... F16K 15/031 137/527.8 |
| 2002/0051717 | A1 | * | 5/2002 | Fukami .................. F04B 9/042 417/420 |
| 2012/0164010 | A1 | * | 6/2012 | Pascual .................. F04B 43/04 417/410.5 |

(Continued)

*Primary Examiner* — Charles G Freay
*Assistant Examiner* — Thomas Fink
(74) *Attorney, Agent, or Firm* — Osha Bergman Watanabe & Bergman LLP

(57) ABSTRACT

A valve head structure and a diaphragm pump having the same are provided. The valve head structure includes a pump body, the pump body including a bonnet and a valve seat connected to each other, the valve seat is provided with a first connecting member; a diaphragm assembly mounted to an upper face of the valve seat, the diaphragm assembly including a plate body provided with a second connecting member fitted with the first connecting member; and a water outlet disc integrally formed on the plate body; a water inlet disc provided with a recessed face with a downwards opening, the water inlet disc being at least partly fitted closely with the recessed face, so as to open or close the water inlet opening.

18 Claims, 5 Drawing Sheets

(56) References Cited

U.S. PATENT DOCUMENTS

| | | | |
|---|---|---|---|
| 2014/0044563 A1* | 2/2014 | Wylie | F04B 9/042 417/38 |
| 2015/0337816 A1* | 11/2015 | Cai | F04B 53/14 417/375 |
| 2016/0108902 A1* | 4/2016 | Cai | F04B 43/026 417/273 |
| 2016/0265525 A1* | 9/2016 | Zhang | F04B 43/026 |
| 2017/0135531 A1* | 5/2017 | Mak | B05B 7/0416 |

* cited by examiner

VALVE HEAD STRUCTURE FOR DIAPHRAGM PUMP AND DIAPHRAGM PUMP HAVING SAME

CROSS-REFERENCE TO RELATED APPLICATION

This application claims priority to and benefits of Chinese Patent Application No. 201711068120.5, filed with State Intellectual Property Office on Nov. 3, 2017, and Chinese Patent Application No. 201721452475.X, filed with State Intellectual Property Office on Nov. 3, 2017, the entire content of which is incorporated herein by reference.

FIELD

The present disclosure relates to a technical field of pumps, and more particularly to a valve head structure for a diaphragm pump and a diaphragm pump having the same.

BACKGROUND

A diaphragm assembly and a valve seat of a water pump in the related art are unreliably mounted and fitted. During repeated movements of a disc, the diaphragm assembly tends to shift, causing that a water outlet opening cannot be closed effectively, seriously affecting water yield of the water pump. In addition, fit between a water inlet disc and the valve seat is not reasonably designed, resulting in inefficient opening and closing actions of the disc, and affecting flow characteristics of the water pump.

SUMMARY

Embodiments of the present disclosure seek to solve at least one of the problems existing in the related art to at least some extent.

For that reason, the present disclosure provides a valve head structure for a diaphragm pump, a diaphragm assembly and a valve seat of the valve head structure are stably positioned.

The present disclosure also provides a diaphragm pump having the above-mentioned valve head structure, the diaphragm pump has good sealing performance and stable water yield.

The valve head structure for the diaphragm pump according to embodiments of the present disclosure includes a pump body, the pump body including a bonnet and a valve seat connected to each other, the valve seat and the bonnet corporately defining a water inlet chamber and a water outlet chamber separated from each other, in which the water inlet chamber is located in an outer ring and the water outlet chamber is located in an inner ring, the bonnet has a water inlet pipe in communication with the water inlet chamber and a water outlet pipe in communication with the water outlet chamber, the valve seat defines a water inlet opening in communication with the water inlet chamber and a water outlet opening in communication with the water outlet chamber, the valve seat is provided with a first connecting member; a diaphragm assembly mounted to an upper face of the valve seat and located in the water outlet chamber, the diaphragm assembly including a plate body provided with a second connecting member fitted with the first connecting member; and a water outlet disc integrally formed on the plate body and used for opening or closing the water outlet opening; a water inlet disc provided with a recessed face with a downwards opening, the water inlet disc being at least partly fitted closely with the recessed face, so as to open or close the water inlet opening.

For the valve head structure for the diaphragm pump according to embodiments of the present disclosure, by providing the first connecting member to the valve seat, and by providing the second connecting member fitted with the first connecting member to the plate body, the diaphragm assembly is reliably and steadily positioned on the valve seat, and the water inlet disc is at least partly fitted closely with the recessed face, allowing the force where the water inlet disc is fitted to be relatively small, ensuring the water inlet disc can be normally opened.

In addition, the valve head structure for the diaphragm pump according to embodiments of the present disclosure can also have the following technical features.

According to an embodiment of the present disclosure, the first connecting member is a positioning pillar extending upwards, and the second connecting member is a positioning hole fitted with the positioning pillar.

According to an embodiment of the present disclosure, the plate body defines the positioning hole in each of a central position and a vertex position radiating outwards, in which the vertex position of the plate body is provided with a columnar portion, and the positioning hole runs through upper and lower faces of the columnar portion.

According to an embodiment of the present disclosure, the water outlet disc includes a connecting portion, an end of the connecting portion being connected to a side wall of the plate body; and a covering portion connected to the other end of the connecting portion.

According to an embodiment of the present disclosure, an upper face of the connecting portion is lower than an upper face of the plate body portion, a lower face of the connecting portion is higher than a lower face of the plate body portion.

According to an embodiment of the present disclosure, thickness of the connecting portion is less than thickness of the covering portion, and the covering portion is circular.

According to an embodiment of the present disclosure, the valve seat is provided with a support stand at a location corresponding to the water outlet opening, the covering portion is supported on the support stand.

According to an embodiment of the present disclosure, the diaphragm assembly is symmetrically arranged with respect to a horizontal center plane of the diaphragm assembly.

According to an embodiment of the present disclosure, the valve seat defines a positioning through hole running through upper and lower faces of the valve seat, the valve seat defines a plurality of water inlet openings in a circumferential direction around the positioning through hole, the water inlet disc has a mounting stem, the mounting stem extends into the positioning through hole from bottom up, so as to make the water inlet disc fitted closely to the lower face of the valve seat, in which the water inlet disc is an elastic piece.

According to an embodiment of the present disclosure, the recessed face is a slanted surface or an arc surface extending outwards taking the positioning through hole as a center, and an upper face of the water inlet disc is a plane.

According to an embodiment of the present disclosure, the water inlet disc has a plate-body structure, the plate-body structure being fitted with the recessed face of the valve seat to open or close the water outlet opening, the plate-body structure including a first parallel face and a second parallel face parallel to each other in the up-down direction.

The diaphragm pump according to embodiments of a second aspect of the present disclosure includes the valve head structure of the above embodiments. Since in the valve head structure according to embodiments of the present disclosure, the diaphragm assembly and the valve seat are stably positioned with good sealing performance, and the water inlet disc can be stably opened, the water yield of the diaphragm pump according to embodiments of the present disclosure is stable.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
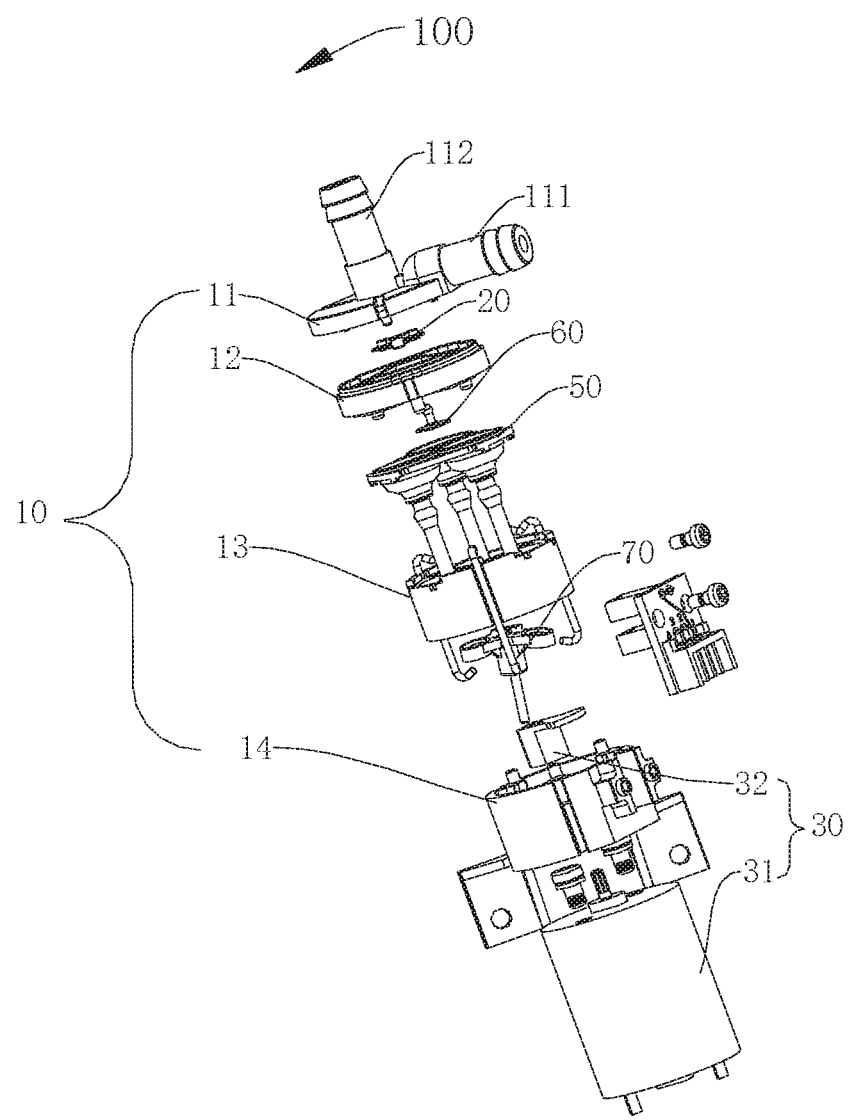
FIG. 1 is an exploded view of a diaphragm pump according to some embodiments of the present disclosure.

REFERENCE NUMERALS diaphragm pump 100;
pump body 10;
bonnet 11;
water inlet pipe 111;
water outlet pipe 112;
valve seat 12;
water inlet opening 121;
water outlet opening 122;
positioning pillar 123;
support stand 124;
positioning through hole 125;
recessed face 126;
cylinder body 13;
base seat 14;
diaphragm assembly 20;
plate body 21;
columnar portion 211;
positioning hole 212;
water outlet disc 22;
connecting portion 221;
covering portion 222;
piston 50;
water inlet disc 60;
mounting stem 61;
plate-body structure 62;
first parallel face 621;
second parallel face 622;
connecting rod assembly 70.

DETAILED DESCRIPTION

Embodiments of the present disclosure will be described in detail in below, examples of the embodiments are illustrated in the drawings. The same or similar elements and the elements having same or similar functions are denoted by like reference numerals throughout the descriptions. The embodiments described herein with reference to drawings are explanatory, and used to generally understand the present disclosure. The embodiments shall not be construed to limit the present disclosure.

A valve head structure for a diaphragm pump 100 according to embodiments of the present disclosure will be described with reference to FIGS. 1-8 in the following, in which the diaphragm pump 100 may be a water pump, an air pump or other fluid pumps, the diaphragm pump can be widely applied in various technical fields, for example applied to household appliances or medical equipment for transmitting fluids. In the following descriptions of the present disclosure, a water pump is illustratively elaborated as an example, and the diaphragm pump can be used for pumping air, liquids or other suspension fluids.

The diaphragm pump 100 substantially includes: a valve head structure, a piston 50 and a drive assembly 30. The valve head structure includes a pump body 10, a diaphragm assembly 20 and a water inlet disc 60.

Specifically, as shown in FIG. 1, the pump body 10 can include a bonnet 11, a valve seat 12, a cylinder body 13 and a base seat 14 that are connected to each other. The valve seat 12 and the bonnet 11 together define a water inlet chamber and a water outlet chamber separated from each other. The water inlet chamber is located in an outer ring and the water outlet chamber is located in an inner ring. The bonnet 11 has a water inlet pipe 111 in communication with the water inlet chamber and a water outlet pipe 112 in communication with the water outlet chamber. The valve seat 12 defines a water inlet opening 121 in communication with the water inlet chamber and a water outlet opening 122 in communication with the water outlet chamber. The valve seat 12 is provided with the water inlet disc 60 and the diaphragm assembly 20, the water inlet disc 60 is used for opening or closing the water inlet opening 121, and the diaphragm assembly 20 has a water outlet disc 22 used for opening or closing the water outlet opening 122.

As shown in FIG. 1, the piston 50 is mounted to the cylinder body 13, the cylinder body 13 defines a mounting hole, the piston 50 has a base plate, and a plurality of cavities are sunken downwards on an upper face of the base plate. The base plate is closely fitted to a surface of the cylinder body 13, and the cavities define the through mounting hole.

As shown in FIG. 1, the drive assembly 30 includes a drive motor 31, an eccentric shaft 32 and a connecting rod assembly 70. A motor shaft of the drive motor 31 is connected with an end of the eccentric shaft 32, the other end of the eccentric shaft 32 is connected with the connecting rod assembly 70. The connecting rod assembly 70 is connected with the piston 50 to drive the cavities, such that the cavities can be stretched or pressed.

Figure 2:
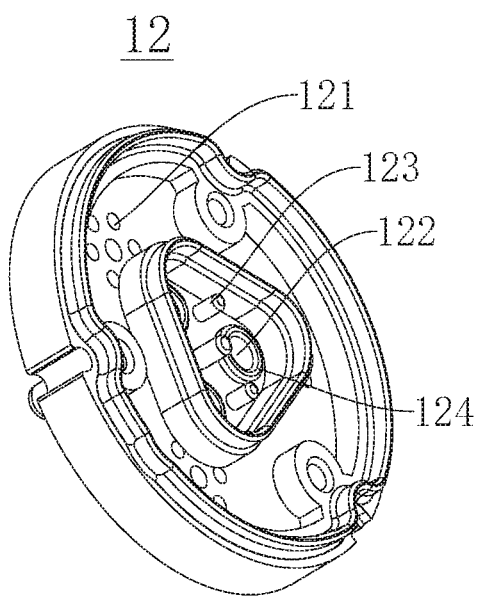
FIG. 2 is a perspective view of a valve seat according to some embodiments of the present disclosure.
Figure 3:
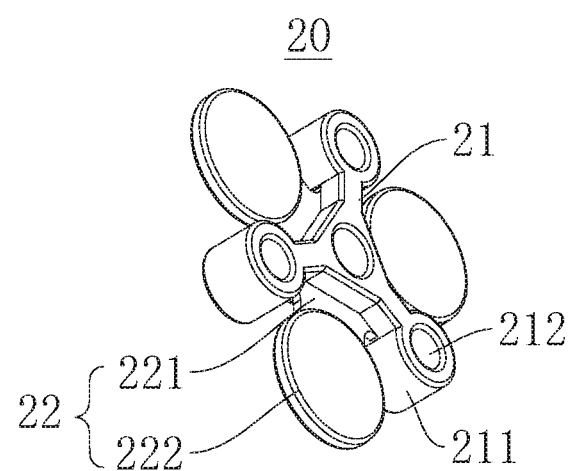
FIG. 3 is a perspective view of a diaphragm assembly according to some embodiments of the present disclosure.
Figure 4:
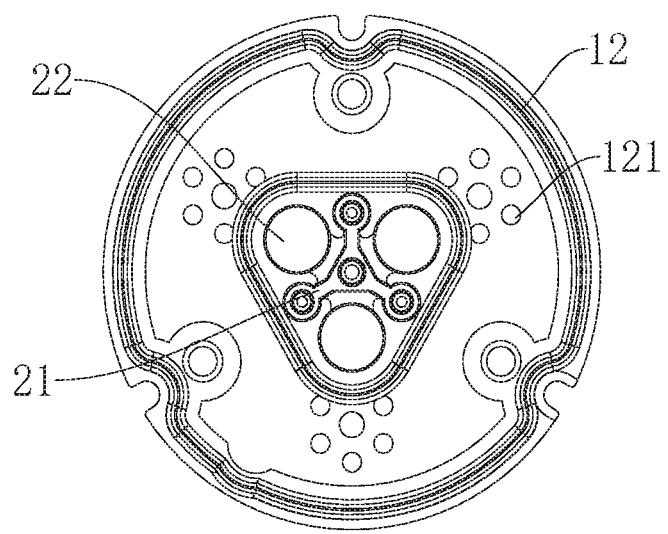
FIG. 4 is an assembly view of a valve seat and a diaphragm assembly according to some embodiments of the present disclosure.
Figure 5:
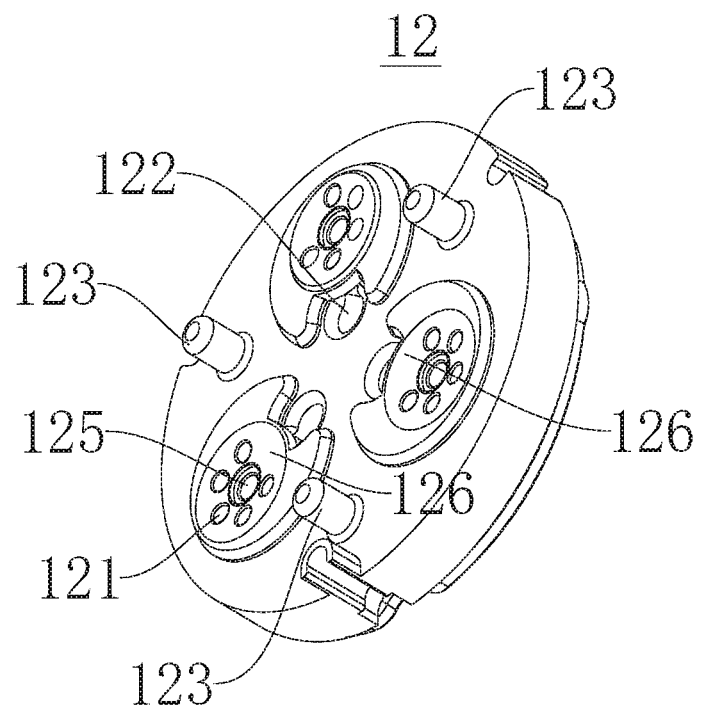
FIG. 5 is a perspective view of a valve seat according to some embodiments of the present disclosure.
Figure 6:
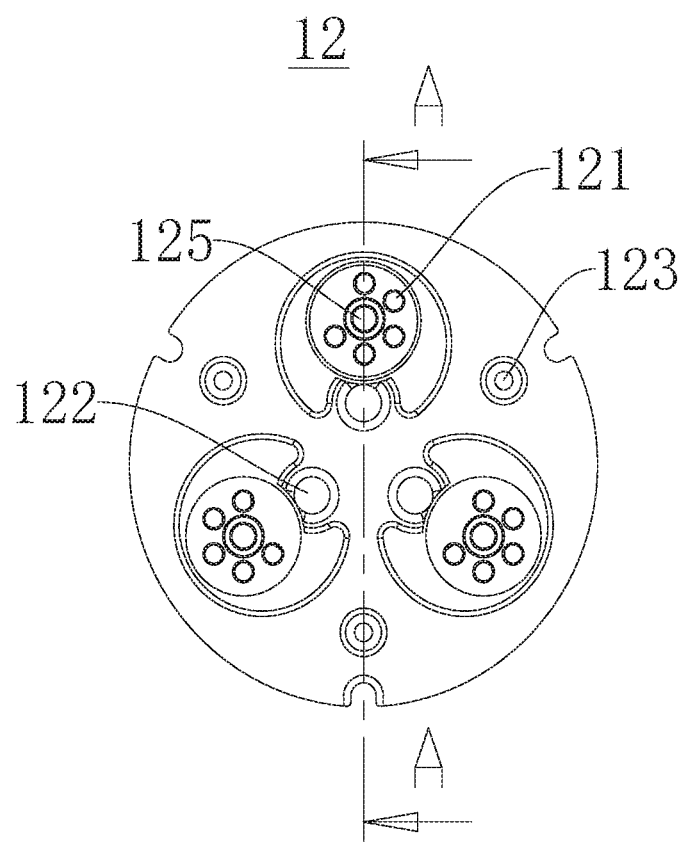
FIG. 6 is a bottom view of a valve seat according to some embodiments of the present disclosure.

As shown in FIG. 4 in combination with FIGS. 2-3. the valve seat 12 is provided with a first connecting member, the diaphragm assembly 20 is mounted to an upper surface of the valve seat 12 and located in the water outlet chamber. The diaphragm assembly 20 includes a plate body 21 and the water outlet disc 22, the valve seat 12 is provided with the first connecting member, and the plate body 21 is provided with a second connecting member fitted with the first connecting member. That is, by means of cooperation between the first connecting member and the second connecting member, the plate body 21 is positioned on the valve seat 12, preventing the diaphragm assembly 20 from moving along a circumferential direction of the valve seat 12, such that the diaphragm assembly 20 can be reliably mounted to the valve seat 12.

A portion of the valve seat 12 is recessed from bottom up to define a recessed face 126, the water inlet disc 60 is at least partly fitted closely with the recessed face 126, so as to open or close the water inlet opening 121. Thus, in case that the water pump sucks water, water flow can run downwards along the recessed face 126 and wash against the water inlet disc 60 to allow the water inlet disc 60 to be opened in a direction away from the water inlet opening; and in case of drainage, the water inlet disc 60 and the recessed face 126 are fitted to close the water inlet opening 121. Since a contact surface between the water inlet disc 60 and the valve seat 12 is relatively small, such that the water inlet disc 60 can be opened or closed normally if the water pump is not in use for a long time, ensuring the normal and steady operation of the water pump.

A working process of the water pump 100 is substantially as follows. When the connecting rod assembly 70 stretches the cavities, an inwardly attractive force is produced, a volume of the cavities is increased, water is sucked into the water inlet chamber through the water inlet pipe 111, then the water inlet disc is opened, water enters in the cavities, thus completing the water suction process. When the connecting rod assembly 70 presses the cavities, the volume of the cavities is reduced, the water outlet disc 22 is opened, water flows out from the cavities and flows into the water outlet chamber through the water outlet opening 122, finally flows out through the water outlet opening 122 and flows out through the water outlet pipe 112, thus completing the water drainage process.

In brief, in the valve head structure for the diaphragm pump 100 according to embodiments of the present disclosure, by providing the first connecting member to the valve seat 12, and by providing the second connecting member fitted with the first connecting member to the plate body 21, the diaphragm assembly 20 is reliably and steadily positioned on the valve seat 12, and the portion of the face of the valve seat 12 fitted with the water inlet disc 60 is recessed upwards to define the recessed face 126, the water inlet disc 60 is at least partly fitted closely with the recessed face 126, ensuring the water inlet disc 60 can be normally opened or closed.

In some embodiments of the present disclosure, the first connecting member is a positioning pillar 123 extending upwards, the second connecting member is a positioning hole 212 fitted with the positioning pillar 123. The reliable connection between the diaphragm assembly 20 and the valve seat 12 is achieved by the fit between the positioning pillar 123 and the positioning hole 212.

In an optional embodiment, the plate body 21 defines the positioning hole 212 in each of a central position and a vertex position radiating outwards, in which a columnar portion 211 is arranged at the vertex position of the plate body 21, the positioning hole 212 runs through upper and lower faces of the columnar portion 211. For example, as shown in FIG. 2 and in combination with FIG. 4, the upper face of the valve seat 12 extends upwards to form four positioning pillars 123, one of the positioning pillars 123 is arranged at the central position, and three positioning pillars 123 at the outer substantially constitute three vertexes of a triangle, in this way, during the assembly process of the diaphragm assembly 20, four positioning holes 212 in the plate body 21 can be directly fitted over the four positioning pillars 123, thus improving the mounting efficiency of the diaphragm assembly 20 and the valve seat 12. It could be understood that, the above embodiments are just schematic and not a limit to protection scope of the present disclosure, the plate body 21 can be in any other shapes, for example a quadrilateral, a hexagon and the like.

The bonnet 11 can be provided with a press-contact piece (not shown in the drawings) at a position corresponding to a vertex of the plate body 21, in this way, after the bonnet 11 and the valve seat 12 are jointed and assembled, the press-contact piece can abut against the vertex of the plate body 21, thus limiting the displacement of the diaphragm assembly 20 in an up-down direction, such that the diaphragm assembly 20 can be further reliably and stably mounted to the valve seat 12.

In some other embodiments, the water outlet disc 22 can include a connecting portion 221 and a covering portion 222. Specifically, an end of the connecting portion 221 is connected to a side wall of the plate body 21, and the covering portion 222 is connected to the other end of the connecting portion 221. The covering portion 222 is used to open or close the water outlet opening 122, i.e., during the water suction of the water pump 100, the covering portion 222 closes the water outlet opening 122, allowing a negative pressure produced in the cavities, completing the water storage process; and during the water drainage of the water pump 100, the water inlet disc closes the water inlet opening 121, the covering portion 222 opens the water outlet opening 122, the cavities are pressed to complete the water drainage process.

In an optional embodiment, an upper face of the connecting portion 221 is lower than an upper face of the plate body 21, a lower face of the connecting portion 221 is higher than a lower face of the plate body 21. In this way, when the water outlet disc 22 flaps in the up-down direction, the connecting portion 221 can provide a sufficient space for deformation.

Furthermore, in an optional embodiment, thickness of the connecting portion 221 is less than thickness of the covering portion 222, in which, the covering portion 222 is circular, thereby effectively improving deformation capacity of the connecting portion 221, making it convenient for the water outlet disc 22 to control opening or closing of the water outlet opening 122.

It could be understood that, if only the connecting portion 221 bends downwards, can the covering portion 222 close the water outlet opening 122, during the long-term service of the water outlet disc 22, the connecting portion 221 itself tends to bend downwards and easily deforms, resulting in that the covering portion 222 is unable to seal the water outlet opening 122 effectively, thereby causing the water yield of the water pump 100 unstable. Therefore, the valve seat is provided with a support stand 124 at a location corresponding to the water outlet opening 122, the covering portion 222 is supported on the support stand 124. Thus, in case that the covering portion 222 closes the water outlet opening 122, the lower faces of the covering portion 222 and the connecting portion 221 can be substantially located in the same plane.

In a specific embodiment, the plate body 21 is substantially in the shape of a triangular prism, the water outlet disc 22 is connected to a side face of the plate body 21. As shown in FIG. 3, a recessed portion is formed between adjacent vertexes of the plate body 21, the water outlet disc 22 is connected to the side of the plate body 21 and is located in the space defined by the recessed portion, making the design of location relationship between the plate body 21 and the water outlet disc 22 of the diaphragm assembly 20 more reasonable, allowing the space occupied by the diaphragm assembly 20 to be relatively small, thereby satisfying the requirements of the water pump 100 for a small overall structure as far as possible.

In some specific embodiments, the diaphragm assembly 20 is symmetrically arranged with respect to its horizontal center plane. That is, a vertical distance between the upper surface of the water outlet disc 22 and the upper surface of the plate body 21 is equal to the vertical distance between the lower surface of the water outlet disc 22 and the lower surface of the plate body 21. In this way, the diaphragm assembly 20 can be forwardly mounted to the valve seat 12 and the diaphragm assembly 20 can also be reversely mounted to the valve seat 12, thereby improving the mounting efficiency of the diaphragm assembly 20 and the valve seat 12, reducing the production cost of the diaphragm pump 100.

Figure 7:
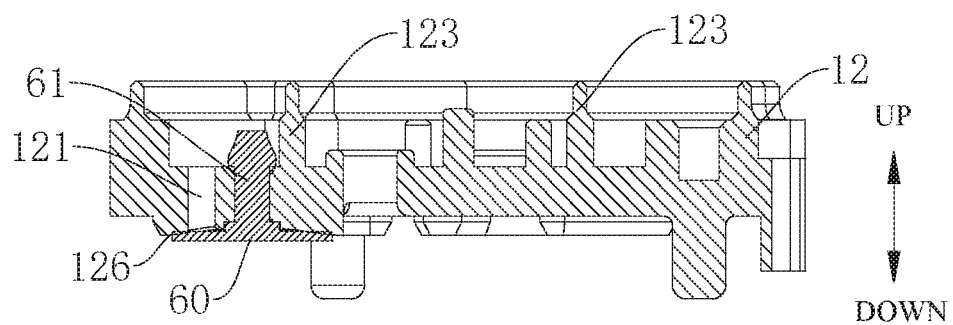
FIG. 7 is a section view along line A-A in FIG. 6, in which a water inlet disc is mounted to a valve seat.
Figure 8:
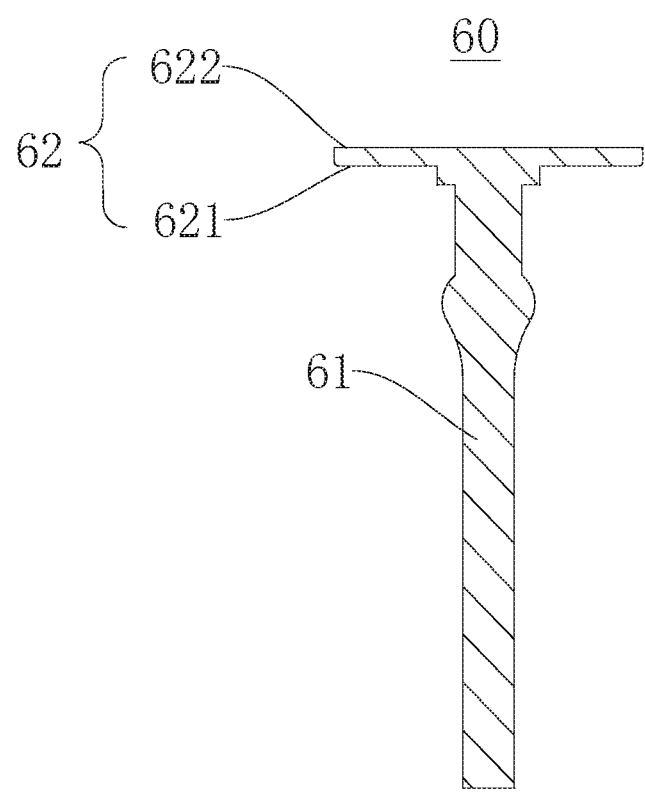
FIG. 8 is a section view of a water inlet disc according to some embodiments of the present disclosure.

In some other embodiments of the present disclosure, the valve seat 12 defines a positioning through hole 125 running through the upper and lower surfaces of the valve seat 12, the valve seat 12 is provided with a plurality of water inlet openings 121 in a circumferential direction around the positioning through hole 125. The water inlet disc 60 has a mounting stem 61, the mounting stem 61 extends into the positioning through hole 125 from bottom up, so as to make the water inlet disc 60 fitted closely to the recessed face 126 of the valve seat 12. The water inlet disc 60 is firmly positioned on the valve seat 12 by means of the mounting stem 61, in which the water inlet disc 60 is made from elastic materials, such as rubber or silicone. As shown in FIG. 7, the mounting stem 61 can be provided with a first position limiting portion, in which the first position limiting portion abuts against the upper surface of the valve seat 12 after being extruded and deformed, thereby limiting the freedom of the mounting stem 61 in the vertical direction.

The mounting stem 61 can be provided with a second position limiting portion, the lower face of the valve seat 12 can be recessed upwards to form a position limiting groove for accommodating the second position limiting portion, thereby limiting the freedom of the mounting stem 61 in the circumferential direction. The water inlet disc can be firmly positioned on the valve seal 12 by cooperation of the first position limiting portion and the second position limiting portion.

In some optional embodiments, the recessed face 126 is a slanted face extending outwards taking the positioning through hole 125 as a center, or the recessed face 126 is an arc face extending outwards taking the positioning through hole 125 as a center, that is, the recessed face 126 is substantially formed as a bowl-shaped face with a downwards opening. Compared with a planar structure, the water flow can run downwards along the slanted face or the arc face, such that the contact surface between the water inlet disc 60 and the valve seat 12 can be forced apart. In case of the same power, the slanted face has a better water inflow.

The upper face of the water inlet disc 60 is a plane. Thus, when the water inlet disc 60 is mounted to the valve seat 12, the slanted face or the arc face can exert downwards forces on the water inlet disc 60 having elasticity, and make the water inlet disc 60 bent downwards. In case of the water suction, the water flow can wash against the upper face of the water inlet disc 60, such that the water inlet disc 60 can be more easily opened or closed, and the water yield of the water pump can be ensured.

In some other embodiments of the present disclosure, the water inlet disc 60 has a plate-body structure, the plate-body structure is fitted with the recessed face of the valve seat 12 to open or close the water outlet opening 122. The plate-body structure 62 includes a first parallel face 621 and a second parallel face 622 parallel to each other in the up-down direction. Thus, it is more beneficial for the water inlet disc 60 to be opened or closed with respect to the valve seat 12, ensuring the stable water yield of the diaphragm pump 100.

The diaphragm pump according to embodiments of the present disclosure includes the valve head structure of the above embodiments. Since in the valve head structure according to embodiments of the present disclosure, the diaphragm assembly 20 and the valve seat 12 are stably positioned with good sealing performance, and the water inlet disc can be stably opened, the water yield of the diaphragm pump according to embodiments of the present disclosure is stable.

Other components and operations of the diaphragm pump 100 are easy to understand and obtain to those skilled in the art, which are not elaborated herein.

In the specification, it is to be understood that terms such as "upper," "lower," "inner," "outer," should be construed to refer to the orientation as then described or as shown in the drawings under discussion. These relative terms are for convenience of description and do not require that the present invention be constructed or operated in a particular orientation.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A valve head structure for a diaphragm pump comprising:
   a pump body comprising a bonnet and a valve seat connected to each other, the valve seat and the bonnet corporately defining a water inlet chamber and a water outlet chamber separated from each other, wherein the water inlet chamber is located in an outer ring and the water outlet chamber is located in an inner ring, the bonnet has a water inlet pipe in communication with the water inlet chamber and a water outlet pipe in communication with the water outlet chamber, the valve seat defines a water inlet opening in communication with the water inlet chamber and a water outlet opening in communication with the water outlet chamber, the valve seat is provided with a first connecting member;
   a diaphragm assembly mounted to an upper face of the valve seat and located in the water outlet chamber, the diaphragm assembly comprising:
   a plate body provided with a second connecting member fitted with the first connecting member;
   a water outlet disc integrally formed on the plate body and used for opening or closing the water outlet opening; and
   a water inlet disc, a face of the valve seat fitted with the water inlet disc being recessed upwards to define a recessed face, the water inlet disc being at least partly fitted closely with the recessed face, so as to open or close the water inlet opening,
   wherein the first connecting member is a positioning pillar extending upwards, and the second connecting member is a positioning hole fitted with the positioning pillar,
   wherein the plate body defines the positioning hole in each of a central position and a vertex position extending outwards, the vertex position of the plate body is provided with a columnar portion, and the positioning hole runs through upper and lower faces of the columnar portion.

2. The valve head structure according to claim 1, wherein the water outlet disc comprises:
   a connecting portion, an end of the connecting portion being connected to a side wall of the plate body; and
   a covering portion connected to the other end of the connecting portion.

3. The valve head structure according to claim 2, wherein an upper face of the connecting portion is lower than an upper face of the plate body, a lower face of the connecting portion is higher than a lower face of the plate body.

4. The valve head structure according to claim 3, wherein thickness of the connecting portion is less than thickness of the covering portion, and the covering portion is circular.

5. The valve head structure according to claim 4, wherein the valve seat is provided with a support stand at a location corresponding to the water outlet opening, the covering portion is supported on the support stand.

6. The valve head structure according to claim 1, wherein the diaphragm assembly is symmetrically arranged with respect to a horizontal center plane of the diaphragm assembly.

7. The valve head structure according to claim 1, wherein the valve seat defines a positioning through hole running through upper and lower faces of the valve seat, the valve seat defines a plurality of water inlet openings in a circumferential direction around the positioning through hole, the water inlet disc has a mounting stem, the mounting stem extends into the positioning through hole from bottom up, so as to make the water inlet disc fitted closely to the lower face of the valve seat, wherein the water inlet disc is an elastic piece.

8. The valve head structure according to claim 7, wherein the recessed face is a slanted face or an arc face extending outwards from the positioning through hole at a center, and an upper face of the water inlet disc is a plane.

9. The valve head structure according to claim 1, wherein the water inlet disc has a plate-body structure, the plate-body structure being fitted with the recessed face of the valve seat to open or close the water inlet opening, the plate-body structure comprising a first parallel face and a second parallel face parallel to each other in a horizontal direction.

10. A diaphragm pump comprising a valve head structure, wherein the valve head structure comprising:
    a pump body comprising a bonnet and a valve seat connected to each other, the valve seat and the bonnet corporately defining a water inlet chamber and a water outlet chamber separated from each other, wherein the water inlet chamber is located in an outer ring and the water outlet chamber is located in an inner ring, the bonnet has a water inlet pipe in communication with the water inlet chamber and a water outlet pipe in communication with the water outlet chamber, the valve seat defines a water inlet opening in communication with the water inlet chamber and a water outlet opening in communication with the water outlet chamber, the valve seat is provided with a first connecting member;
    a diaphragm assembly mounted to an upper face of the valve seat and located in the water outlet chamber, the diaphragm assembly comprising:
    a plate body provided with a second connecting member fitted with the first connecting member;
    a water outlet disc integrally formed on the plate body and used for opening or closing the water outlet opening; and
    a water inlet disc, a face of the valve seat fitted with the water inlet disc being recessed upwards to define a recessed face, the water inlet disc being at least partly fitted closely with the recessed face, so as to open or close the water inlet opening,
    wherein the first connecting member is a positioning pillar extending upwards, and the second connecting member is a positioning hole fitted with the positioning pillar,
    wherein the plate body defines the positioning hole in each of a central position and a vertex position extending outwards, the vertex position of the plate body is provided with a columnar portion, and the positioning hole runs through upper and lower faces of the columnar portion.

11. A valve head structure for a diaphragm pump comprising:
    a pump body comprising a bonnet and a valve seat connected to each other, the valve seat and the bonnet corporately defining a water inlet chamber and a water outlet chamber separated from each other, wherein the water inlet chamber is located in an outer ring and the water outlet chamber is located in an inner ring, the bonnet has a water inlet pipe in communication with the water inlet chamber and a water outlet pipe in communication with the water outlet chamber, the valve seat defines a water inlet opening in communication with the water inlet chamber and a water outlet opening in communication with the water outlet chamber, the valve seat is provided with four positioning pillars, one of the four positioning pillars is located at a central position of the valve seat, and three of the four positioning pillars are around the central position of the valve seat and located at three vertexes of a triangle;

a diaphragm assembly mounted to an upper face of the valve seat and located in the water outlet chamber, the diaphragm assembly comprising:

a plate body provided with four through holes fitted over the four positioning pillars;

a water outlet disc integrally formed on the plate body and used for opening or closing the water outlet opening; and a water inlet disc, a face of the valve seat fitted with the water inlet disc being recessed upwards to define a recessed face, the water inlet disc being at least partly fitted closely with the recessed face, so as to open or close the water inlet opening.

12. The valve head structure according to claim 11, wherein the water outlet disc comprises:

a connecting portion, an end of the connecting portion being connected to a side wall of the plate body; and a covering portion connected to the other end of the connecting portion.

13. The valve head structure according to claim 12, wherein an upper face of the connecting portion is lower than an upper face of the plate body, a lower face of the connecting portion is higher than a lower face of the plate body.

14. The valve head structure according to claim 13, wherein thickness of the connecting portion is less than thickness of the covering portion, and the covering portion is circular.

15. The valve head structure according to claim 14, wherein the valve seat is provided with a support stand at a location corresponding to the water outlet opening, the covering portion is supported on the support stand.

16. The valve head structure according to claim 11, wherein the diaphragm assembly is symmetrically arranged with respect to a horizontal center plane of the diaphragm assembly.

17. The valve head structure according to claim 11, wherein the valve seat defines a positioning through hole running through upper and lower faces of the valve seat, the valve seat defines a plurality of water inlet openings in a circumferential direction around the positioning through hole, the water inlet disc has a mounting stem, the mounting stem extends into the positioning through hole from bottom up, so as to make the water inlet disc fitted closely to the lower face of the valve seat, wherein the water inlet disc is an elastic piece.

18. The valve head structure according to claim 17, wherein the recessed face is a slanted face or an arc face extending outwards from the positioning through hole at a center, and an upper face of the water inlet disc is a plane.

* * * * *